United States Patent [19]

Matsushita et al.

[11] Patent Number: 6,015,856
[45] Date of Patent: *Jan. 18, 2000

[54] COMPOSITE RESIN MATERIAL AND METHOD OF FORMING THE SAME

[75] Inventors: Mitsumasa Matsushita; Takumi Taniguchi; Takashi Ohta; Norio Sato; Yuji Hoshino, all of Nagoya; Kanemitsu Kondo, Anjo; Naruaki Abe; Toshiyuki Suzuki, both of Toyota, all of Japan

[73] Assignee: Toyota Jidosha Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/746,347

[22] Filed: Nov. 8, 1996

[30] Foreign Application Priority Data

Nov. 10, 1995 [JP] Japan ..................................... 7-293003
May 9, 1996 [JP] Japan ..................................... 8-114895

[51] Int. Cl.$^7$ ................. C08J 3/34; C08K 3/34
[52] U.S. Cl. ................. 524/451; 523/200; 523/205; 523/206; 524/500; 524/507; 525/66; 525/125; 525/131; 525/424
[58] Field of Search ................. 524/451, 507, 524/500; 523/206, 200, 205

[56] References Cited

U.S. PATENT DOCUMENTS

| | | | |
|---|---|---|---|
| 4,051,095 | 9/1977 | Karmell | 260/31.8 |
| 5,104,932 | 4/1992 | Dawans | 525/54.5 |
| 5,208,379 | 5/1993 | Yang et al. | 564/468 |
| 5,225,471 | 7/1993 | Tajima et al. | 524/284 |
| 5,342,884 | 8/1994 | Tabor et al. | 525/64 |
| 5,476,624 | 12/1995 | Sato et al. | 264/83 |
| 5,585,152 | 12/1996 | Tamura et al. | 428/35.1 |

*Primary Examiner*—Ana Woodward
*Attorney, Agent, or Firm*—Finnegan, Henderson, Farabow, Garrett & Dunner, L.L.P.

[57] ABSTRACT

A composite resin material exhibiting excellent physical properties, which is formed by adding semi-rigid or rigid polyurethane resin waste to a thermoplastic reactive resin, a nonreactive resin, a polymer alloy or the like. A first kind of the composite resin material is composed of a crosslinking polyurethane resin and a reactive resin, a nonreactive resin or a polymer alloy, which is formed by kneading the crosslinking polyurethane resin and the reactive resin, the nonreactive resin or the polymer alloy at a predetermined temperature or more. A second kind of the composite resin material is composed of a hydrolysis product of crosslinking polyurethane resin and a solid filler, which are mixed with a nonreactive resin and a polymer alloy by kneading. A third kind of the composite resin material is formed by kneading a moisture-absorbing crosslinking polyurethane resin, a reactive resin and one of a reactive resin, a nonreactive resin and a polymer alloy composed of a resilient rubber material and a thermoplastic resin at a temperature of not less than the hydrolysis temperature of the crosslinking polyurethane resin and not less than the melting point of the one of the nonreactive resin and the polymer alloy.

15 Claims, 6 Drawing Sheets

MICRO VOID 6

MICRO VOID 6

COMPOSITE RESIN MATERIAL AND METHOD OF FORMING THE SAME

BACKGROUND OF THE INVENTION

1. Field of the Invention

The present invention relates to a composite resin material composed of a crosslinking polyurethane resin or a hydrolysis product thereof and one kind of a reactive resin, a nonreactive resin and a polymer alloy thereof, and a method of forming the above-described composite resin material.

2. Description of Related Art

Recently, as the earth environment has become worse, construction of such a society as to protect the earth environment has been demanded In order to reduce an environmental load and use resources effectively, recycling of resin waste has been investigated.

For example, recycling of resin parts of motor vehicles has been investigated variously. In particular, recycling of resin bumpers which are large-sized exterior parts of motor vehicles has been investigated earnestly.

The resin bumpers are generally composed of polypropylene resin and polyurethane resin. Polypropylene resin is a remeltable thermoplastic resin and can be recycled by remolding polypropylene waste, whereas polyurethane resin is a thermosetting resin which defines an insoluble and unmeltable molecular framework due to crosslinking reaction To recycle polyurethane resin, it must be subjected to some treatments.

Methods of recycling resin bumpers composed of polyurethane resin include a method of decomposing polyurethane resin to original raw materials by a chemical treatment such as glycolysis, aminolysis or hydrolysis (chemical recycling), a method of burning polyurethane resin and recovering thermal energy therefrom (thermal recycling), and a method of cutting and/or pulverizing polyurethane resin to be recycled as a packing, a filler, a levelling material, a sound absorption material, a vibration damping material or the like, or compression molding polyurethane resin together with a binder to be recycled as substitutes for rubber parts (material recycling).

In the above-described material recycling of mixing polyurethane resin bumper waste into a resin material or the like, to prevent problems such as deterioration of the material properties and surface quality resulting from inhomogeneously dispersing of additives, it is important to enhance the mixing properties of these materials. To this end, the polyurethane resin bumper waste must be pulverized into fine particles.

Japanese patent application laid-open No. Sho 50-154379 discloses a technique of pulverizing a polyurethane foam scrap, nixing the pulverized scrap with a thermoplastic resin, and injection or extrusion molding a resultant mixture.

Japanese patent application laid-open No. Sho 57-45026 discloses a technique of pulverizing thermosetting polyurethane resin waste to have a particle diameter of 1 mm orless, kneading the pulverized waste with a thermoplastic polyurethane resin, and thermoplastically molding the kneaded material.

Japanese patent application laid-open No. Sho 57-45027 discloses a technique of pulverizing thermosetting polyurethane resin waste to have a particle diameter of 1 mm or less, kneading the pulverized waste with a thermoplastic polyurethane resin and vinyl chloride resin, and calendering the kneaded material.

When polyurethane resin powder is mixed into a thermoplastic resin, it is important to pulverize the polyurethane resin finely for increasing the compatibility thereof. The above-described conventional techniques, however, do not include any proposal to pulverize polyurethane resin at a low cost, and accordingly, lack practicability.

And the above-described conventional techniques are merely the techniques of mechanically pulverizing a thermosetting polyurethane resin and adding the pulverized resin to a thermoplastic resin as a filler. There is no disclosure about the reaction property of the thermosetting polyurethane resin powder, structural change of the polyurethane resin due to hydrolysis, and influence on the material properties.

SUMMARY OF THE INVENTION

It is an object of the present invention to provide a composite resin material exhibiting, novel properties, wherein a crosslinking polyurethane resin powder disperses in a base resin homogeneously with good compatibility and good affinity, as different from a mechanically mixed resin material, and a method of forming the composite resin material thus characterized.

With a first aspect of the present invention, a composite resin material is composed of a crosslinking polyurethane resin and a reactive resin, and formed by kneading the crosslinking polyurethane resin and the reactive resin at a temperature of not less than the melting point of the reactive resin.

With a second aspect of the present invention, a method of forming a composite resin material composed of a crosslinking polyurethane resin and a reactive resin includes the steps of kneading a moisture-absorbing crosslinking polyurethane resin and the reactive resin at a temperature of not less than the hydrolysis temperature of the moisture-absorbing crosslinking polyurethane resin and not less than the melting point of the reactive resin.

With a third aspect of the present invention, a composite resin material is composed of a crosslinking polyurethane resin and a nonreactive resin, and is formed by kneading a moisture-absorbing crosslinking polyurethane resin and the nonreactive resin at a temperature of not less than the hydrolysis temperature of the moisture-absorbing crosslinking polyurethane resin.

With a fourth aspect of the present invention, a method of forming a composite resin material composed of a crosslinking polyurethane resin and a polymer alloy includes the steps of kneading a moisture-absorbing crosslinking polyurethane resin and a polymer alloy composed of a resilient rubber material and a thermoplastic resin at a temperature of not less than the hydrolysis temperature of the moisture-absorbing crosslinking polyurethane resin.

With a fifth aspect of the present invention, a method of forming a composite resin material composed of a crosslinking polyurethane resin and a polymer alloy includes the steps of kneading a moisture-absorbing crosslinking polyurethane resin and a polymer alloy composed of a resilient rubber material and an olefin-based thermoplastic resin at a temperature of not less than the hydrolysis temperature of the moisture-absorbing crosslink polyurethane resin and not less than the oxidation temperature of the olefin-based thermoplastic resin.

With a sixth aspect of the present invention, a composite resin material is composed of a nonreactive resin of a high viscosity and a nonreactive resin of a relatively low viscosity, which surrounds a solid filler as a core, the nonreactive resin of a relatively low viscosity or a polymneralloy thereof dispersing in the form of fine particles in a matrix composed of the nonreactive resin of a relatively high viscosity or a polymer alloy thereof.

With a seventh aspect of the present invention, amethod of forming a composite resin material includes the step of kneading a nonreactive resin of a relatively high viscosity or a polymer alloy thereof, a water-containing crosslinking polyurethane resin and a solid filler at a temperature of not less than the melting point of the nonreactive resin or the polymer alloy thereof, and not less than the hydrolysis temperature of the crosslinking polyurethane resin.

With an eighth aspect of the present invention, a method of forming a composite resin material includes the steps of kneading a nonreactive resin of a relatively high viscosity or a polymer alloy thereof, a hydrolysis product of a crosslinking polyurethane resin of a relatively low viscosity, and a solid filler at a temperature of not less than the melting point of the nonreactive resin or the polymer alloy thereof.

With a ninth aspect of the present invention, a method of fanning a composite resin material includes the steps of kneading a water-containing crosslinking polyurethane resin of a relatively low viscosity and one of a nonreactive resin of a relatively high viscosity and a polymer alloy thereof, at least one of the water-containing crosslinking polyurethane resin of a relatively low viscosity and the nonreactive resin of a relatively high viscosity or the polymer alloy thereof containing a solid filler, at a temperature of not less than the melting point of the nonreactive resin or the polymer ally thereof and not less than the hydrolysis temperature of the crosslinking polyurethane resin.

With a tenth aspect of the present invention, a method of forming a composite resin material includes the steps of kneading a crosslinking polyurethane resin of a relatively low viscosity and one of a nonreactive resin of a relatively high viscosity and a polymer alloy thereof at least one of the crosslinking polyurethane resin of a relatively low viscosity and the nonreactive resin of a relatively high viscosity or the polymer alloy thereof containing a solid filler, at a temperature of not less than the melting point of the nonreactive resin or the polymer alloy thereof and not less than the hydrolysis temperature of the crosslinking polyurethane resin.

Other objects, features, and characteristics of the invention will become apparent upon consideration of the following description and the appended claims with reference to the accompanying drawings, all of which form a part of this specification.

BRIEF DESCRIPTION OF THE DRAWING

FIG. 2 is a photograph through a scanning electron microscope, which shows a dispersing state of crosslinking polyurethane resin particles in a cross-section of a resin of a composite body of a comparative example No. 1a;

FIG. 4 is a photograph through a scanning electron microscope, which shows a dispersing state of crosslinking polyurethane resin particles in a cross-section of a resin of a composite body of a comparative example No. 2a;

FIG. 5 (B) is a model diagram of FIG. 5 (A);

FIG. 6 (A) is a photograph through a transmission electron microscope, which shows a dispersing state of tale in a cross-section of a resin of a composite body of a comparative example No. 16a;

FIG. 6 (B) is a model diagram of FIG. 6 (A);

FIG. 7 (B) is a model diagram of FIG. 7 (A);

FIG. 8 (B) is a model diagram of FIG. 8 (A).

DETAILED DESCRIPTION OF THE PRESENTLY PREFERRED EXEMPLARY EMBODIMENTS

Figure 1:
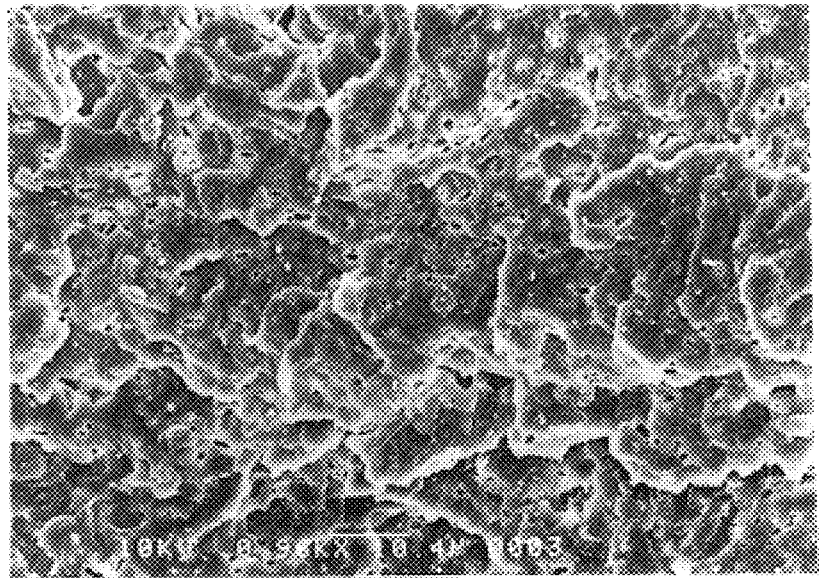
FIG. 1 is a photograph through a scanning electron microscope, which shows a dispersing state of crosslinking polyurethane resin particles in a cross-s section of a resin of a composite body of an example No. 1 in accordance with the present invention.

The present invention relates to a composite resin material composed of a crosslinking polyurethane resin and at least one of a reactive resin, a nonreactive resin and a polymer alloy, and a method of producing the same.

The composite resin material of the present invention can be formed as follows:

1. A crosslinking polyurethane resin and a reactive resin are kneaded at a temperature of not less than the melting point of the reactive resin;

2. A water-containing crosslinking polyurethane resin and a reactive resin are kneaded at a temperature of not less than the hydrolysis temperature of the crosslinking polyurethane resin and not less than the melting point of the reactive resin;

3. A water-containing crosslinking polyurethane resin and a nonreactive resin are kneaded at a temperature of not less than the hydrolysis temperature of the crosslinking polyurethane resin;

4. A water-containing crosslinking polyurethane resin and a polymer alloy composed of a resilient rubber material and a thermoplastic resin are kneaded at a temperature of not less than the hydrolysis temperature of the crosslinking polyurethane resin;

5. A water-containing crosslinking polyurethane resin and a polymer alloy composed of a resilient rubber material and an olefin-based thermoplastic resin are kneaded at a temperature of not less than the hydrolysis temperature of the crosslinking polyurethane resin and not less than the oxidation temperature of the olefin-based thermoplastic resin.

The composite resin material obtained by the method No. 1 has a structure that the crosslinking polyurethane resin disperses finely in the reactive resin due to cutting of polyurethane crosslinks caused by the reaction of the crosslinking polyurethane resin and the reactive resin, and dispersing crosslinking polyurethane resin and the reactive resin bond together in disperse interfaces thereof.

With the composite resin material obtained by the method No. 2, cutting of polyurethane crosslinks is accelerated due to the reaction of the crosslinking polyurethane resin and reactive resin, and hydrolysis caused by water in the crosslinking polyurethane resin, whereby finely dispersing bonding of the crosslinking polyurethane resin can be accelerated, as compared to the composite resin material obtained by the method No. 1.

With the composite resin materials obtained by the methods Nos. 3 and 4, polyurethane crosslinks are cut due to hydrolysis of the water-containing crosslinking polyurethane resin to effect excellent finely dispersing of the crosslinking polyurethane resin in the nonreactive resin or polymer alloy, as compared to the conventional composite resin material.

With the composite resin material obtained by the method No. 5, polyurethane crosslinks are cut due to hydrolysis of the water-containing crosslinking polyurethane resinto generate active groups, which react with carboxyl groups generated due to oxidation of one part of the olefin-based resin, whereby higher compatibility can be expected, like the method using the reactive resin.

As a result, finely dispersing of crosslinking polyurethane resin, which has not been conventionally achieved, can be achieved, and the physical properties as a resin material can be also enhanced.

The present invention also relates to a composite resin material composed of a crosslinking polyurethane resin or a hydrolysis product thereof, a solid filler and at least one resin out of a nonreactive resin and a polymer alloy thereof, and a method of producing the same.

The above-described composite resin material can be formed as follows:

6. A water-containing crosslinking polyurethane resin, a solid filler and a nonreactive resin or a polymer alloy thereof are kneaded at a temperature of not less than the melting point of the nonreactive resin or polymer alloy thereof and not less than the hydrolysis temperature of the crosslinking polyurethane resin.

7. A hydrolysis product of crosslinking polyurethane resin, a solid filler and a nonreactive resin or a polymer alloy thereof are kneaded at a temperature of not less than the melting point of the nonreactive resin or polymer alloy thereof 8. A water-containing crosslinking polyurethane resin and a nonreactive resin or polymer alloy thereof, at least one of the water-containing crosslinking polyurethane resin, the nonreactive resin, and the polymer alloy thereof containing a solid filler, are kneaded at a temperature of not less than the melting point of the nonreactive resin or polymer alloy thereof and not less than the hydrolysis temperature of the crosslinking polyurethane resin.

9. A hydrolysis product of a crosslinking polyurethane resin and a nonreactive resin or polymer alloy thereof, at least one of the hydrolysis product of a crosslinking polyurethane resin and the nonreactive resin or polymer alloy thereof containing a solid filler, are kneaded at a temperature of not less than the melting point of the nonreactive resin or polymer alloy thereof.

10. The nonreactive resin and polymer alloy thereof must have a melt viscosity higher than the viscosity of the hydrolysis product of the crosslinking polyurethane resin.

With the composite resin materials formed by the methods Nos. 6 and 8, crosslink points of the crosslinking polyurethane resin are cut due to hydrolysis with water therein, and the crosslinking polyurethane resin disperses finely in the nonreactive resin or polymer alloy thereof with a shearing force while kneading.

With the composite resin materials formed by the methods Nos. 7 and 9, the hydrolysis product of crosslinking polyurethane resin disperses finely in the nonreactive resin or polymer alloy thereof with a shearing force while kneading.

With the composite resin material having the characteristic No. 10, the hydrolysis product of crosslinking polyurethane resin coheres in such a way as to surround the solid filler due to the viscosity difference upon kneading and molding, thus effecting finely dispersing.

As a result, finely dispersing which has not been achieved with conventional similar composite resin materials becomes possible, and the physical properties as a resin can be enhanced.

Examples of the crosslinking polyurethane resin of the present invention include semi-rigid or rigid polyurethane resin which is formed by reaction injection molding or reinforced reaction injection molding of a material including a hydroxy compound, an isocyanate compound and a crosslinking agent as main ingredients. It is unnecessary to limit it to the waste produced in production processes or recovered from the market. New materials will do. Alternatively, new materials and waste may be mixed together.

The hydroxy compound composing the crosslinking polyurethane resin of the present invention is not limited specifically. Examples thereof include hydroxypolyester formed from polybasic acid as a polyester compound, which includes phthalic acid, adipic acid, maleic acid or the like, and a hydroxy compound such as glycols, trimethylolpropane, hexanetriol, glycerin, pentaerisnrtol or the like. Alternatively, polyetlier polyol such as poly (oxypropylene ether) polyol and poly (oxyethylene-propylene ether) polyol, acryl polyol,a derivative of castor oil, a derivative of tall oil, polypropylene glycol, polyethylene glycol or other compounds having two or more hydroxyl groups will do.

One or more kinds of these hydroxy compounds may be used. A linear or diverging configuration will do. Each hydroxy compound may have two or more functional hydroxyl groups.

Examples of the isocyanate compound composing the crosslinking polyurethane resin in accordance with the present invention include aromatic isocyanate such as 2, 4-toluenediisocyanate, 2, 6-toluenediisocyanate, and 4, 4'-diphenylmethane dilsocyanate, aliphatic isocyanate such as hcxamethylene diisocyanate, a trimer of toluene diisocyanate and a derivative such as a urea polymer of toluene diisocyarate.

One or more kinds of these isocyanate compounds may be used. Each isocyanate compound may have two or more functional isocyanate groups. The preferred isocyanate compound is aromatic isocyanate, because it is suitable for the reaction injection molding.

Examples of the crosslinking agent include amines such as hexamethylenediamine, 4, 4'-diamino diphenylmethane, and diethyltoluenediamine. One or more kinds of these compounds may be used.

The above-described hydrolysis product of crosslinking polyurethane resin can be formed under the hydrolysis conditions described below, and can be obtained by holding the water-containing crosslinking polyurethane resin at a temperature above the hydrolysis temperature thereof and below the liquefaction temperature thereof. In this case, the crosslinking polyurethane resin can be treated solely or in the coexistence of a thermoplastic resin.

The hydrolysis product of crosslinking polyurethane resin having a relatively low viscosity in accordance with the present invention means a hydrolysis product of resin including a hydroxy compound, an isocyanate compound and a crosslinking agent as main ingredients, and formed by reaction injection molding, which has a structure that crosslinks are partly maintained and partly cut, and, when kneaded and molded, has a viscosity lower than the melt viscosity of the nonreactive resin or a polymer alloy thereof.

In accordance with the present invention, if required, an alcohol-based supplementary crosslinking agent such as triethanolamine, a mold release agent such as synthetic wax, metallic soap and silicone oil, a stabilizer such as anultraviolet absorber and an oxidation inhibitor, a catalyst such as triethyleamine, N-methylmoleholin, triethylenediamine and di-n-butyltindilaurate, a filler such as glass fiber and potassium titanate, a pigment, a coloring material and other additives may be added.

Any resin which has functional groups reactable with crosslinks of the crosslinking polyurethane resin or active groups resulting from hydrolysis, and is meltable by heating may be used as the reactive resin.

Examples of the reactive resin include a thermoplastic resin such as nylon resin and vinyl acetate copolymer resin and other thermoplastic resins having at least one kind of functional group such as an ester group, a carboxyl group, an acid anhydride group, an epoxy group, an acryl group, an amino group, a hydroxyl group and an oxazoline group. Specifically, maleic acid-renatured polypropylene resin, epoxy-renatured polyethylene resin will do.

Examples of the polyamide resin include 6-nylon, 12-nylon, 6, 6 nylon and a renatured resin such as a copolymer of 6-nylon and 6,6 nylon, a copolymer of 6 nylon and 12 nylon, a polymer alloy of 6 nylon and polypropylene resin and polymer alloy of 6 nylon and ABS resin.

The composition ratio of the crosslinking polyurethane resin and the reactive resin is not limited specifically.

In addition, a monomer or oligomer which has functional groups reactable with crosslinks of the crosslinking polyurethane resin or active groups resulting from hydrolysis may be added.

Examples thereof include an amine compound such as triethanol amine and diethyltoruen diamine, an acid anhydride such as malcic anhydride, a monomer compound such as an organometallic compound, a thermosetting resin such as expoxy resin, amino resin and phenol resin, and an oligomer compoundsuch as liquid rubber.

The nonreactive resin means a resin which does not have any functional group reactable with crosslinks of the crosslinking polyurethane resin or active groups resulting from hydrolysis, and is meltable by heating. It is preferable that the melting point is 300° C. or less, because wherethe nonreactive resin is left at 310° C. or more for a longtime, the polyurethane resin decomposes into a liquid state.

The nonreactive resin or polymer alloy thereof, which has a relatively high viscosity, means a resin which does not have any functional group reactable with crosslinks of the crosslinking polyurethane resin or active groups resulting front hydrolysis, and is meltable by heating. It is not limited specifically provided that the melt viscosity thereof upon kneading and molding is higher than the viscosity of the hydrolysis product of polyurethane resin. It is preferable that the melting point is 300° C. or less, because where the resin is left at 310° C. or more for a long time, the polyurethane resin decomposes into a liquid state.

The composition ratio of the nonreactive resin or polymer alloy thereof in the composite resin material is not limited specifically provided that the nonreactive resin or polymer alloy thereof can maintain a structure as a matrix component. The preferred composition ratio ranges from 30% by weight to 99% by weight in consideration of moldability or the like. In particular, if the mechanical properties are required, the preferred composition ratio is 50% by weight or more.

Examples of the nonreactive resin include olefin-based resin such as polypropylene resin and polyethylene resin, and a thermoplastic polyurethane resin.

The composition ratio of the crosslinking polyurethane resin and the nonreactive resin is not limited specifically.

The kneading at a temperature of not less than the melting point means a treatment performed at a temperature of not less than the temperature at which a normal thermoplastic resin kneadably melts.

When the semi-rigid or rigid crosslinking polyurethane resin and the reactive resin are kneaded at a temperature of not less than the melting point of the reactive resin, the crosslinking polyurethane resin is not always required to absorb moisture.

The polymer alloy of the nonreactive resin in accordance with the present invention is a high polymer multi-components-based resin composed of a resilient rubber material and a thermoplastic resin, and can be classified into a copolyrner resin such as a block copolymer and a graft copolymer, and a polymer-blend resin such as a physical blend and a chemical blend. Examples of the physical blend include a fusion blend and a compatibility giving agent-added blend, and examples of the chemical blend include a polymer complex, a solution graft, an interpenetrating polymer network (IPN) and a reactive processing. One or more kinds of these materials may be used.

Examples of the resilient rubber material include acryl rubber, chlorinated polyethylene, ethylene-propylene rubber, ethylene-propylene-diene rubber, acrylonitrile-butadiene rubber and ethylene-acrylic acid copolymer.

Examples of the thermoplastic resin include polystyrene resin, polypropylene resin, polyethylene resin and polymethylmetacrylate resin.

The preferred thermoplastic resin is a polymer alloy including an olefin-based resilient rubber material and an olefin-based thermoplastic resin as main ingredients.

Examples of the olefin-based thermoplastic resin include Polypropylene resin and polyethylene resin. If the olefin-based thermoplastic resin is included as a main ingredient, any resin other than the olefin-based resin may be included. Furthermore, rubber may be added to the olefin-based thermoplastic resin in the form of compolymers.

The olefin-based resilient rubber material means a rubber including as a main ingredient copolymers composed of at least two kinds of olefin compounds such as ethylene, propylene and butylene. If the olefin rubber is included as a main ingredient, diene rubber or the like may be included in the form of copolymers. Examples of the diene rubber include ethylene-propylene rubber, ethylene-propylene-diene rubber and ethylene-butylene rubber.

The composition ratio of the olefin-based thermoplastic resin and the olefin-based resilient rubber material is not limited specificly. It is desirable for a polymer alloy to include a larger amount of olefin-based thermoplastic resin. One or more kinds of the olefin-based resilient rubber material and olefin-based thermoplastic resin may be used, respectively.

Any polymer alloy will do, if melted by heating. It is preferable that the polymer alloy melts at 300° C. or less, because where the polymer alloy is left at 310° C. or more for a long time, the polyurethane resin decomposes into a liquid state.

The composition ratio of the crosslinking polyurethane resin and polymer alloy is not limited specifically.

The solid filler of the present invention may have any configuration other than a fiber-like configuration. Any filler which is adapted to be normally added to a resin material or the like will do provided it does not melt nor decompose while kneading.

Examples of the solid filler include an inorganicfiller such as talc, alumina, silica, calcium carbonate and mica, and an organic filler such as silicone resin, teflon resin and phenol resin. The preferred solid filler is talc.

One or more kinds of solid fillers may be used. Surface treatment may be performed.

The method of adding the solid filler is not limited. It may be added while kneading, or included in a resin material to be used.

The preferred particle diameter of the solid filler is 100 $\mu$m or less in consideration of the influence on the mechanical properties and surface quality. To enhance the core effect upon finely dispersing, it is more preferable that the solid filler has a particle diameter of 10 $\mu$m or less.

The composition ratio of the solid filler is not limited specifically. Preferably, it can be decided in consideration of the composition ratio of the solid filler and the hydrolysis product of crosslinking polyurethane resin. In particular, i the weight ratio of the hydrolysis product of crosslinking polyurethane resin and the solid filler ranges trom 5:1 to 1:20, the solid filler exhibits a good core effect to enhance the mechanical properties of the composite resin material.

The hydrolysis product of crosslinking polyurethane resin having a relatively low viscosity is a hydrolysis product of resin which includes a hydroxy compound, an isocyanate compound and a crosslinking agent as main ingredients and is formed by reaction injection molding, and has a structure that crosslinks are partly maintained and partly cut. Upon kneading and molding the hydrolysis product of a relatively low viscosity, the viscosity thereof becomes lower than the pelt viscosity of the nonreactive resin or polymer alloy thereof.

The hydrolysis product of crosslink-ing polyurethane resin can be obtained by holding a water-containing crosslinking polyurethane resin at a temperature above the hydrolysis temperature thereof and below the liquefaction temperature thereof.

The hydrolysis product of crosslinking polyurethane resin can be obtained by treating the crosslinking polyurethane resin solely or in the coexistence of a thermoplasticresin.

In accordance with the present invention, if required, other filler, a coloring agent such as carbon black, apigment, an oxidation inhibitor, an ultraviolet absorber, afire retardant, a mold release agent or like additives may be added.

In accordance with the present invention, a moisture-absorbing crosslinking polyurethane resin must be kneaded with a polymer alloy at a temperature of not less than thehydrolysis temperature of the moisture-containing crosslinking polyurethane resin.

If kneaded at a temperature of not less than the oxidation temperature of the polymer alloy, active groups such as carboxyl groups are formed in the polymer alloy to generate an alloying reaction with the polyurethane resin. When an urethane bumper and an olefin polymer alloy are used, for example, the preferred kneading temperature ranges from 200 to 300° C., and the more preferred kneading temperature ranges from 230 to 280° C. When the kneading temperature is too low, a long treating time is required, and bond of polyurethane resin with alloy resin is not be expected. When the kneading temperature is too high, the polyurethane resin changes into a liquid state and the thermal degradation of the polymer alloy proceeds, which results in the deterioration of material properties.

Hydrolysis conditions:

To heat the semi-rigid or rigid crosslinking polyurethane resin at a temperature of not less than the hydrolysis temperature thereof, it is important that the crosslinking polyurethane resin absorbs moisture properly. The preferred moisture content of the crosslinking polyurethane resin which has not been previously dried is 0.1% or more. The upper limit of the moisture content is 10%. If the moisture content exceeds 10%, the treatment becomes difficult due to water vapor generated upon kneading The more preferred moisture content ranges from 0.5 to 6%.

The crosslinking polyurethane resin may not contain water provided that the treatment is performed in the presence of water. Water may be aided such that the moisture content becomes 10% or less in hydrolysis treatment. About 0.1% or more of water content will do as a standard thereof.

Furthermore, compounds containing active hydrogen, organometallic compounds or the like may be added for accelerating the decomposing reaction. And other additives may be added in such a ratio as not to deviate from the scope of the present invention.

With the present invention, since the crosslinking points of the semi-rigid or rigid crosslinking polyurethane resin are cut with heat and water, water must be prevented from vaporizing therefrom while treating.

The preferred treating temperature is not less than the hydrolysis temperature of the crosslinking polyurethane resin and not more than the liquefaction temperature thereof.

In the case of a polyurethane resin bumper, for example, the preferred treating temperature ranges from 200° C. to 310° C., because if the treating temperature is lower than 200° C., a long treatment time is required, which is less practical. If the treating temperature is too high, the materials changes into a liquid state or gas state, and harmful components such as cyan may be generated, which is less preferable.

The heating means is not limited specifically. It is preferable that the heating means can heat uniformly in a short time.

The treating time is decided properly in accordance with the composition of the crosslinking polyurethane resin, treating temperature, arrangement of the treating device or the like.

Kneading:

Kneading of the crosslinking polyurethane resin, reactive resin and nonreactive resin may be performed with a kneading device provided with heating means, such as flat rollers, an extruder and a kneader. One or more kinds of thereactive resin and nonreactive resin may be used in combination.

In particularly, a screw-type extruder is preferable, because water vaporization can be restrained and continuous treatment is possible.

To treat large-sized parts such as bumpers, it ispreferable to crush them into an average particle diameter of 1 to 50 mm, previously.

Furthermore, various additives such as a stabilizer, a coloring agent, a filler and a fire retardant may be added upon kneading without deviating from the objects of the present invention, Composite resin materials:

The composite resin material in accordance with the present invention has a structure that the crosslinking polyurethane resin, reactive resin and nonreactive resin disperse mutually in the form of fine particles. The composite resin material thus constructed achieves the following operational advantages, as compared to the case where mechanically pulverized powders are merely mixed.

1. Even if grains have a diameter greater than 1 mm, they can disperse in a resin in the form of fine particles.

2. By dispersing the crosslinking polyurethane resin finely, both the surface quality and breaking strength are improved.

3. Active groups resulting from cutting of crosslinks of the crosslinking polyurethane resin, and polar groups existing in the nonreactive resin act to enhance the compatibility of the crosslinking polyurethane resin with the nonreactive resin.

4. The above-described properties cannot be obtained by the conventional composite resin material including mechanically pulverized crosslinking polyurethane resin particles.

5. The polar groups (reactive groups) act to enhance the compatibility with a resin.

6. When the composite resin material deforms, interfaces between fine particles of the hydrolysis product of crosslinking polyurethane resin and the nonreactive resin or polymer alloy thereof peel off to generate micro voids (eyes phenomenon), thus absorbing deformation energy.

7. The above-described interfaces act as starting points of micro crazings to absorb deformation energy, thus enhancing the mechanical properties.

The above-described properties cannot he expected with the conventional composite resin material including the mechanically pulverized crosslinking polyurethane resin particles.

The particle diameters of the polyurethane resin in both shearing treatment and hydrolysis around the solid filler depend on the use thereof, and accordingly, are decided properly in accordance with the use thereof.

In the case of the composite resin material being composed of crosslinking polyurethane resin and polypropylene resin, for example, the preferred particle diameter of the polyurethane resin is 200 μm. If the particle diameter is too great, the appearance of moldings may deteriorate, and dispersing becomes insufficient to cause lowering of the mechanical strength, so as to be less preferable.

The degree of the reaction of the crosslinking polyurethane resin and reactive resin is decided properly in accordance with the use and required properties of the composite resin material.

To form the composite resin material, it is preferable to cut one half or more of the urethane links of the crosslinking polyurethane resin, more preferably, the great portion thereof, because, if cutting of the urethane links is insufficient, the crosslinking polyurethane resin does not change into fine particles even by applying a shearing force thereto. It is preferable to cut 20 to 100% of the urethane links of the crosslinking polyurethane resin, more preferably, 50 to 100% thereof It is preferable that one half or more of urea bonds of the crosslinking polyurethane resin remain uncut, because, if many urea bonds are cut, the crosslinking polyurethane resin changes into a liquid state, thus disenabling the formation of an objective material. It is preferable to cut 0 to 80% of urea bonds of the crosslinking polyurethane resin, more preferably, 0 to 50% thereof.

If the material to be blended with the crosslinking polyurethane resin has polar groups, the improved compatibility can be obtained by the action of active groups in the composite resin material which does not bond with the material to he bonded. These polar groups enable improvement of the affinity and wet strength, thus facilitating mixing witha resin. Furthermore, the hydroxyl groups act to prevent electrification of the composite resin material.

The kneading device is not limited specifically, but a screw revolution-type kneader is preferable, because it exhibits operational advantages such as prevention of water diffusion, continuous treatment, efficiently kneading with a shearing force so as to be suitable for a treating device.

Embodiments:

The treatment of a crosslinking polyurethane resin will be explained based on the treatment of a bumper composed of polyurethane resin, which is produced by reinforced reaction injection molding.

Polypropylene glycol, diethyltoluene diamine and 4, 4'-diphenyl methanediisocyanate were used as monomer raw materials, and potassium titanate in the form of single crystal fiber whiskers were used as a reinforcing material. These materials were molded into a thickness of about 3 mm with a reaction injection molding device, and crushed into a particle diameter of about 5 mm with a hammer mill (Treated material 1).

Another molded material having a composition identical to that of the Treated material 1 was formed by reaction injection molding and pulverized mechanically into an average particle diameter of 100 μm to obtain a comparative material 1.

Homo-type polypropylene resin manufactured by Surnitiomo Kagaku kogyo Co., Ltd. (H 501) was used as the nonreactive resin.

The polymer alloy was prepared by adding a rubber component composed of ethylene propylene rubber (Esplene V01115 made by Sumitomo Kagalcu Kogyo Co., Ltd.: propylene content 22 wt %) and ethylene butene rubber (Esplene No372 manufactured by Sumitomo Kagaku Kogyo Co., ltd.: butene content 13 wt %)to a homo-type polypropylene resin manufactured by SumitomoKagaku Kogyo Co., ltd. (H 501).

The solid fller was composed of talc having an average particle diameter of about 5 μm (untreated).

The treating device used was as follows:

1: Twin-screw extruder AS-30-2 type (L/D=30) manufactured by Nakatani Machine Co., Ltd.

2: Twin-screw kneader NEX-T60+Single-screw kneader manufactured by Kobe Seikosho Co., Ltd.

3: Twin-screw reaction extruder TEX-3 α (L/D) 45.5) manufactured by The Japan Steel Works, Ltd.

Hydrolysis product of crosslinking polyurethane resin.

A hydrolysis product of crosslinking polyurcthaneresin was prepared by treating the Treated material 1 in a naturally moisture-absorbing state (moisture content: about 0.8% ) with the treating device 1 (Treated material 3). The treating temperature was 260° C. Treatment was performed with a head of the extruder open. The treating time of the material was about 60 secs.

Embodiment 1:

A composite body composed of a crosslinking polyurthane resin and a reactive resin Coarse grains of a polyurethane resin bumper (hereinafter will be called PU) were added to polyamnide (hereinafter will be called PA) resin in the composition ratio of 30% by weight. And the influence on the physical properties and dispersing state were evaluated. The compositions of the resin and PU are shown in TABLE, 1.

TABLE 1

| No. | Resin No. | Kind of resin | Moisture absorbing state | PU content | PU coarseness |
|---|---|---|---|---|---|
| Example | | | | | |
| 1 | 3024U | 12PA | dry | 30 wt % | coarse grain |
| 2 | 7125U | 6PA/12PA | dry | 30 wt % | coarse grain |
| 3 | N-1200 | 12PA | dry | 30 wt % | coarse grain |
| 4 | H-200K | 6PA/PP | dry | 30 wt % | coarse grain |
| Comparative example 1a | AZ564 | PP | dry | 30 wt % | Comparative material 1 |

12PA resin (3024U) and 6PA/12 PA—copolymeic resin (7125U) manufactured by Ube Kosan Co., Ltd., soft 12PA resin (glylax N-1200) manufactured by Dainihon Ink Kagaku Kogyo Co., Ltd., and a polymer alloy of 6PA resin. and polypropylene resin (Enbnyte H 200K, containing 25% of glass fiber) manufacturec by Chisso Kagaku Co., Ltd. used as the PA resin.

Each PA resin and PU coarse grains were kneaded With the twin-screw extruder of the treating device 1 into a pellent-like state. Next test pieces were prepared by injection molding for evaluation.

The extruding conditions and molding conditions of each resin are shown in TABLE 2. Water was removed from the PA resin and PU coarse grains with vacuum drying.

TABLE 2

| No. | Twin-screw extrusion conditions | | | Injection conditions | |
|---|---|---|---|---|---|
| | Resin temp. | Number of Revolution | Kneading time | Resin temp. | Mold temp. |
| Example | | | | | |
| 1 | 200° C. | 400 rpm | about 1 min. | 200° C. | 70° C. |
| 2 | 200° C. | 400 rpm | about 1 min. | 210° C. | 85° C. |
| 3 | 210° C. | 600 rpm | about 1 min. | 210° C. | 40° C. |
| 4 | 230° C. | 400 rpm | about 1 min. | 205° C. | 50° C. |
| Comparative example 1a | 200° C. | 400 rpm | about 1 min. | 195° C. | 50° C. |

For comparison, by using polypropylene (PP) resin (Nobulene AZ 564) manufactured by Sumitomo Kagaku Kogyo Co., Ltd. as the nonreactive resin, similar treatments were performed. Treated material 1 was used as the PU coarse grains.

The results of the tensile test of the test pieces and the visual observation of the dispersing state of PU are shown together in TABLE 3.

TABLE 3

| No. | Tensile strength (MPa) | Tensile elongation (%) | PU dispersing state (visual observation) |
|---|---|---|---|
| Example | | | |
| 1 | 32.8 | 95 | homogeneously dispersing |
| 2 | 25.5 | 148 | homogeneously dispersing |
| 3 | 23.6 | 119 | homogeneously dispersing |
| 4 | 66.8 | 3* | homogeneously dispersing |
| Comparative example 1a | 19.9 | 17 | inhomogeneously dispersing |

*) does not elongate due to the addition of 25% of glass fiber

As apparent from TABLE 3, there was a clear difference in tensile elongation between the examples of the present embodiment Nos. 1 to 3 and comparative example No. 1a. These results show that with the composite resin material ofthe present embodiment, the mechanical properties can be improved.

As the result of the visual observation, in examples Nos. 1 to 4, there was no PU particle, whereas in the comparative example No. 1a, there remained PU particles.

The above results show that the composite resin material of the present embodiment, which is formed by kneading the reactive resin and the crosslinking poyurethane resin at a melting point of the reactive resin, exhibits an improved compatibity due to the reaction of the crosslinking polyurethane resin and nylon of the reaction resin. In contrast, in the comparative example in which the crosslinking polyurethane resin and the polypropylene resin as the nonreacting resin are kneaded, no reaction was generated between the crosslinking polyurethane resin and the polypropylene resin, and the resultant tensile strength was insufficient.

Figure 2:
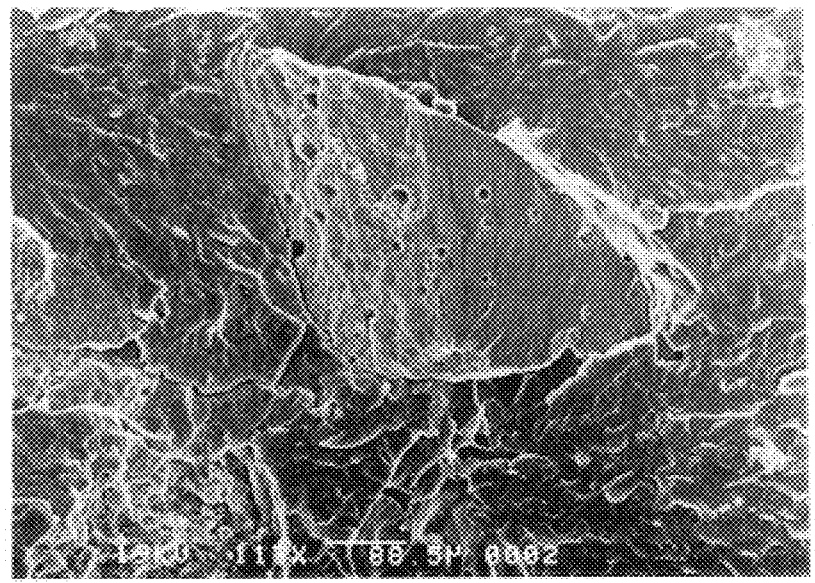

The dispersing state of the PU powder particles in each of the example No. 1 and comparative example No. 1a was observed with a scanning electron microscope. The photographs therethrough were shown in FIGS. 1 and 2.

In the example No. 1 (FIG. 1), no PU powder particle was observed, but whiskers included in the PU powder disperse in the PA resin. This shows that in the kneading step, both plasticizing of the PU powder and reaction of the PU powder plasticized and PA resin proceeded so that the PU powder dispsersed homogeneously in the PA resin.

In contrast, in the comparative example No. 1a (FIG. 2), the state of the PU powder does not change after extruding with the twin-screw extruder and injection molding. PU powder particles having a diameter of not less than 100 μm were observed in the test piece.

These results show that by kneading the crosslinking polyurethane resin and reactive resin at a temperature of not less than the melting point of the reactive resin, they easily react with each other to form a composite resin material having improved physical properties. In contrast in the composite resin material formed by kneading the nonreactive resin and dry crosslinking polyurethane resin, the crosslinking polyurethane resin remains unchanged so as not to exhibit improved mechanical properties. This shows that the dispersing state of PU differs between the example No.1 of the present embodiment and comparative example.

Embodiment 2:

A PU coarse powder of which the moisture content was about 0.8% (Treated material 1) was added to 6PA resin (1022 B) manufactured by Ube Kosan Co., Ltd. in the composition ratio of 30% by weight of the 6PA resin, and the mixture was kneaded at 240° C. with the biaxial extruder of the treating device 1 into a strands-like state. The strands thus obtained had resiliency, and could not remelt by heating. This shows that the PU powder react with the PA resin to form a novel improved resin.

This novel resin thus formed can be used as moldings or the like.

This result shows that the composite resin material formed by kneading the moisture-absorbing crosslinking polyurethane resin and the reactive resin at a temperature of not less than the hydrolysis temperature of the crosslinking-polyurethne resin and not less than the melting point of the reactive resin had properties different from those of the composite resin material formed by kneading the conventional mechanically pulverized powders.

Embodiment 3:

PU coarse grains of which the moisture content was about 0.8% (Treated material 1) was added to PP resin (noblene AZ564) manufactured bl, Sumitomo Kagaku Kogyo Co., Ltd.as the nonreactive resin in the composition ratio of 30% by weight of the PP resin. And a resulting mixture was kneaded with the treating device 2. First, the kneading was performed at 250° C. with the twin-screw kneader, and then performed at 210° C. with the single-screw kneader into a strands-like state to obtain pellets. The pellets thus obtained were dried, and test pieces were prepared by injection molding (190° C.).

For comparison, by using a dry PU (Comparative material 1), similar treatments were performed. The evaluation results are shown in 'lABI,E 4.

TABLE 4

| No. | Resin No. | Resin type | Moisture absorbing state | PU content | PU coarseness |
|---|---|---|---|---|---|
| Example 6 | AZ564 | PP | naturally moisture absorbing state | 30 wt % | coarse grains |
| Comparative example 2a | AZ564 | PP | dry | 30 wt % | comparative example 1 |

The results of the tensile test of the test pieces and the visual observation of the dispersing state of PU powder are shown in TABLE 5.

TABLE 5

| No. | Tensile strength (MP) | Tensile elongation (%) | PU dispersing state (visual observation) |
|---|---|---|---|
| Example 6 | 18.7 | 80 | homogeneously dispersing |
| Comparative example 2a | 17.5 | 15 | inhomogeneously dispersing |

As apparent from TABLE 5, there was a great difference in tensile elongation between the example No. 6 and the comparative example No. 2a, which shows that with the present embodiment, the mechanical properties were improved.

As a result of the visual observation, in the example No. 6, no PU particle was observed, whereas in the comparative example No. 2a, there could be confirmed the existence of PU particles.

These results show that the properties of the composite resin material of the present embodiment are different from those of the composite resin material obtained by kneading mechanically pulverized PU powder.

Figure 3:
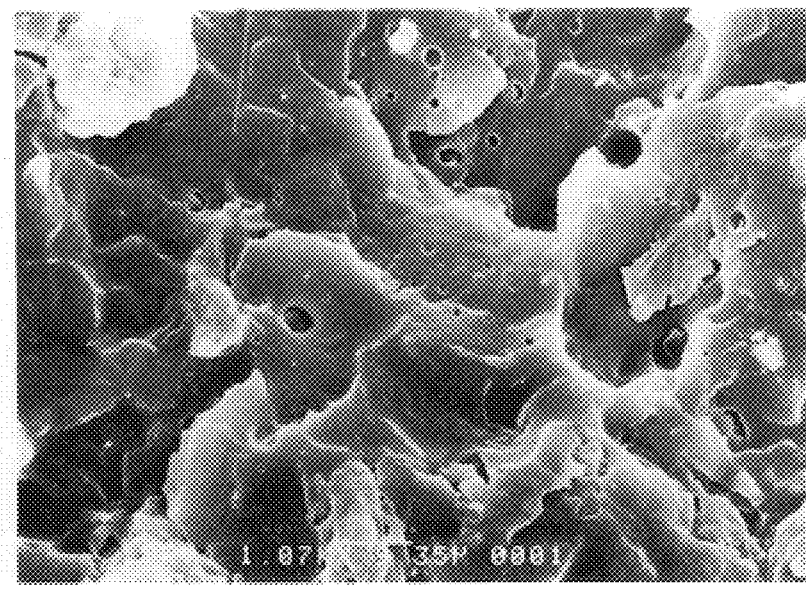
FIG. 3 is a photograph through a scanning electron microscope, which shows a dispersing state of crosslinking polyurethane resin particles in a cross-section of a resin of a composite body of an example No. 6 in accordance with the present invention.
Figure 4:
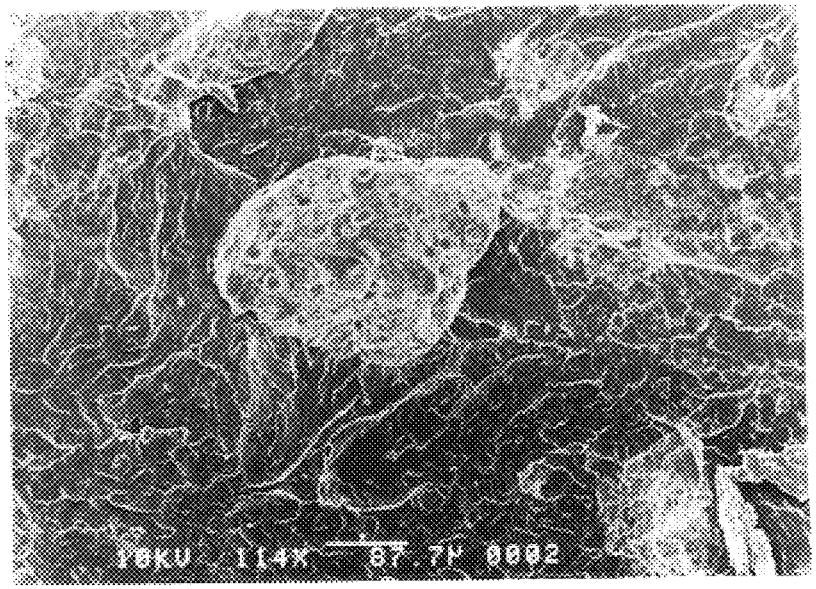

The photographs, each showing the dispersing state of PU powder particles of the example No. 6 or comparative example No. 2a through a scanning electron microscope, are shown in FIGS. 3 and 4

In the example No. 6 shown in FIG. 3, the PU powder and polypropylene (PP) were mixed unseparably. This shows that, in the kneading step, PU was plasticized due to hydrolysis and dispersed in PP homogeneously due to a shearing force.

In contrast, in the comparative example No. 2a shown in FIG. 4, the state of PU powder does not change even after biaxially extruding and injection molding. PU powder having a particle diameter of not less than 100 $\mu$m was observed in the test piece.

These results show that the composite resin material obtained by kneading the moisture-absorbing crosslinking polyurethane resin and the nonreactive resin at a temperature of not less than the hydrolysis temperature of the moisture-absorbing crosslinking polyurethane resin is excellent in mechanical properties, as compared to the conventional composite resin material containing mechanically pulverized PU powder, and the PU dispersing state thereof is different from that of the conventional composite resin material.

Embodiment 4

A low density polyethylene (PE) resin (LJ 800) manufactured by Mitsubisi Kagaku Co., Ltd. and 30% by weight of PU coarse grains of which the moisture content is about 0.8% (Treated material 1) were kneaded with the treating device 2.

The kneading was performed at 250° C. (not less than the hydrolysis temperature) with the twin-screw kneader, andthen performed at 210° C. with the single-screw kneader into a strand-like state to obtain pellets. These pellets were dried and subjected to an injection molding (190° C.) to obtain a test piece.

For comparison, PU resin (Comparative example 1) in a dry state was subjected to similar treatments at 150° C. (not more than the hydrolysis; temperature).

The evaluation results of this embodiment are shown in TABLE 6.

TABLE 6

| No. | Resin No. | Resin type | Moisture absorbing state | PU content | PU coarseness |
|---|---|---|---|---|---|
| Example 7 | LJ800 | PE | naturally moisture absorbing state | 30 wt % | coarse grains |
| Comparative example 3a | LJ800 | PE | dry | 30 wt % | comparative example 1 |

The results of the tensile test of the test pieces and visual observation of the dispersing state of PU are shown in TABLE 7.

TABLE 7

| No. | Tensile strength (MPa) | Tensile elongation (%) | PU dispersing state (visual observation) |
|---|---|---|---|
| Example 7 | 8.3 | 150 | homogeneously dispersing |
| Comparative example 3a | 7.6 | 35 | inhomogeneously dispersing |

As apparent from TABLE 7, there was a clear difference in tensile elongation between the example No. 7 and the comparative example No. 3a, which shows that with the present embodiment, the mechanical properties of the moldings were improved.

And in the example No. 7, there could not be observed any PU particle, whereas in the comparative example No. 3a, there could be confirmed the existence of PU particles.

These results show that the composite resin material of the present embodiment has properties different from those of the conventional composite resin material obtained by mixing mechanically pulverized materials, and by treatingthe moisture-absorbing PU at a temperature of not less thanthe hydrolysis temperature thereof, the mechanical properties of the composite resin material can be improved, as compared to those with the conventional techniques, Embodiment 5

A polypropylene resin bumper material which is a polymer alloy of polypropylene resin and polyolefin rubber was used. This polymer alloy was pulverized with a hammer mill into coarse grains, of which one side is not more than about 16 mm. thus obtaining a treated material 2.

For comparison, polypropylene resin (noblene AZ 564) manufactured by Sumitomo kagaku Kogyo Co., Ltd. was used (Comparative material 2). The compositions of examples of the composite maternal are shown in TABLE 8.

TABLE 8

| No. | PU resin | Resin | Moisture-absorbing state | PU content |
|---|---|---|---|---|
| Example 8 | Treated material 1 | Treated material 2 | moisture-absorbing state | 30 wt % |
| Example 9 | Treated material 1 | Treated material 2 | moisture-absorbing state | 30 wt % |
| Comparative example 4a | — | Treated material 2 | — | — |
| Comparative example 5a | Comparative material 1 | Comparative material 2 | moisture-absorbing state | 30 wt % |

Treating device 1 twin-screw extruder of $\phi$ 48 L/D=41.6

Treating device 2: injection molding machine manufactured by Meiki Co., ltd. (mold clamping pressure: 350 ton)

30% by weight of urethane bumper (PU) coarse grains (Treated material 1) were added to a polymer alloy (Treated material 2), and the influence on the physical properties and the dispersing state were evaluated. For comparison, similar evaluations of the treated material 2 and the combination of the PP resin (Comparative material 2) and PU resin (Comparative material 1) were also performed.

Kneading was performed with the twin-screw extruder of the treating device 1 to form pellets. Next, test pieceswere formed by injection molding with the treating device 2. The extruding conditions and molding conditions of each test pieces are shown in TABLE 9. The temperature of each resin upon extruding with the twin-screw extruder was not less than the oxidation temperature of the polymer alloy.

TABLE 9

| | twin-screw extrusion conditions | | | injection conditions | |
|---|---|---|---|---|---|
| No. | Resin temp. | Number of revolution | Kneading time | Resin temp. | Mold temp. |
| Example 8 | 250° C. | 400 rpm | about 1 min. | 200° C. | 40° C. |

TABLE 9-continued

| | twin-screw extrusion conditions | | | injection conditions | |
|---|---|---|---|---|---|
| No. | Resin temp. | Number of revolution | Kneading time | Resin temp. | Mold temp. |
| Example 9 | 250° C. | 600 rpm | about 1 min. | 200° C. | 40° C. |
| Comparative example 4a | — | — | about 1 min. | 200° C. | 40° C. |
| Comparative example 5a | 250° C. | 400 rpm | about 1 min. | 195° C. | 50° C. |

Upon extruding with the biaxial extruder, a polymer alloy and PU coarse grains, both undried, were used, and the moisture content of the polyurethane resin was about 0.8%.

The results of the tensile test and the visual observation of the dispersing state of PU in each test piece are shown in TABLE 10.

TABLE 10

| No. | Tensile elongation (%) | PU dispersing state (visual observation) |
|---|---|---|
| Example 8 | 130 | homogeneously dispersing |
| Example 9 | 230 | homogeneously dispersing |
| Comparative example 4a | 110 | — |
| Comparative example 5a | 95 | homogeneously dispersing |

As apparent from TABLE 10, there was a clear difference in tensile elongation between the examples Nos. 8 and 9 and the comparative examples Nos. 4a and 5a. These results show that the mechanical properties are improved with the present embodiment.

These results also show that the composite resin material obtained by kneading the water-containing crosslinking polyurethane resin and polymer alloy composed of the resilient rubber material and the thermoplastic resin it a temperature of not less than the hydrolysis temperature of the crosslinking polyurethane resin (250° C.) exhibits improved mechanical properties, as compared to the composite resin materials of the Comparative examples Nos. 4a and 5a, each containing no polymer alloy.

Embodiment 6

Examples Nos. 10 to 13 and comparative examples Nos. 6a to 12a were formed by using homo-type PP (H 501) as a nonreactive resin, talc as a solid filler and the treated material 1 composed of crosslinking polyurethane resin in a naturally moisture-absorbing state (moisture content: about 0.8%). The composition ratio (parts by weight) of each example is shown in TABLE 11.

TABLE 11

| No. | H501 nonreactive | Talc solid filler | Treated material 1 PU powder |
|---|---|---|---|
| Example | | | |
| 10 | 80 | 20 | 5 |
| 11 | 80 | 20 | 10 |
| 12 | 80 | 20 | 20 |
| 13 | 80 | 20 | 30 |

TABLE 11-continued

| No. | H501 nonreactive | Talc solid filler | Treated material 1 PU powder |
|---|---|---|---|
| Comparative example | | | |
| 6a | 100 | 0 | 0 |
| 7a | 90 | 10 | 0 |
| 8a | 80 | 20 | 0 |
| 9a | 100 | 0 | 5 |
| 10a | 100 | 0 | 10 |
| 11a | 100 | 0 | 20 |
| 12a | 100 | 0 | 30 |

Each example was formed with the twin-screw extruder of the treating device 3 into a strand-like state to obtainpellets. Next, the pellets were dried and subjected to an injection molding, thus forming test pieces.

In the extruding step, the homo-type PP, talc and treated material 1 were respectively weighed and mixed together while kneading. The resin temperature was 260° C., the number of revolutions of a screw was 500 rpm, and the kneading time was about 2 minutes The injection molding was performed at a resin temperature of 190° C. and at a mold temperature 60° C.

Each test piece was subjected to an Izod impact test (JIS K7110) at a normal temperature. The test results are shown in TABLE 12.

TABLE 12

| No. | Izod impact value (J/m$^2$) |
|---|---|
| Example | |
| 10 | 69 |
| 11 | 73 |
| 12 | 61 |
| 13 | 55 |
| Comparative example | |
| 6a | 30 |
| 7a | 27 |
| 8a | 25 |
| 9a | 38 |
| 10a | 45 |
| 11a | 48 |
| 12a | 46 |

In the comparative examples Nos. 6a to 8a, as theamount of talc added to the homo-type PP increases, the Izod impact value decreases. In the comparative examples Nos. 9a to 12a, the Izod impact value of the homo-type PP increases due to the addition of polyurethane resin. In contrast, in the examples Nos. 10 to 13, the lzod impact value increases due to the addition of PU resin and talc, as compared to the comparative examples Nos. 9a to 12a. These test results show that the materials of the present embodiment are effective in improvement of the mechanical properties.

Embodiment 7

Examples Nos. 14 and 15 and comparative examples Nos,. 13a to 15a were formed by using homo-type PP (H 501) as a nonreactive resin, ethylene propylene rubber (VO115), ethylene butene rubber (N0372), talc as a solid filler and PIJ powder in a naturally moisture-absorbing state (moisture content: about 0.8%) (Treated material 1). The composition ratio of each example is shown in TABLE 13.

TABLE 13

| No. | H501 PP resin | V0115 EPR | N0372 EBR | Talc filler | Treated material 1 PU resin |
|---|---|---|---|---|---|
| Example | | | | | |
| 14 | 60 | 15 | 15 | 10 | 30 |
| 15 | 50 | 15 | 15 | 20 | 30 |
| Comparative example | | | | | |
| 13a | 60 | 15 | 15 | 10 | 0 |
| 14a | 50 | 15 | 15 | 20 | 0 |
| 15a | 70 | 15 | 15 | 0 | 30 |

Each example was formed with the twin-screw extruder of the treating device 3 into a strand-like state to obtain pellets. Next, the pellets were dried and subjected to an injection molding, thus preparing test pieces.

In the extruding step, the homo-type PP, ethylenepropylene rubber (FPR), ethylene butene rubber (EBR), talc and treating material 1 were respectively weighted and mixed together while kneading. The resin temperature was 260° C., the number of revolutions of a screw was 500 rpm, and the kneading time was about 2 minutes. The injection molding was performed at a resin temperature of 190° C. and at a mold temperature of 60° C.

Each test piece was subjected to an Izod impact test (JIS K7110) at a normal temperature. The test results are shown in TABLE 14.

As a result, an Izod impact value is improved by mixing talc as a solid filler with treating material 1 as PU resin as shown in TABLE 14. This shows that the composite resin material of the present embodiment is effective in improvement of the mechanical properties.

TABLE 14

| No. | Izod impact value (J/m$^2$) |
|---|---|
| Example | |
| 14 | 250 |
| 15 | 290 |
| Comparative example | |
| 13a | 185 |
| 14a | 180 |
| 15a | 170 |

Embodiment 8

Examples Nos. 16 to 20 and a comparative example No. 16a were formed by using homo-type PP (H 501), ethylene propylene rubber (VO115), ethylene butene rubber (N0372), talc as a solid filler and a crosslinking polyurethane resin in a naturally moisture-absorbing state (moisture content: about 0.8%) (Treated material 1). The composition ratio of each example is shown in TABLE 15.

TABLE 15

| No. | H501 PP resin | V0115 EPR | N0372 EBR | Talc filler | Treated material 1 PU resin |
|---|---|---|---|---|---|
| Example | | | | | |
| 16 | 60 | 15 | 15 | 10 | 2 |
| 17 | 50 | 15 | 15 | 10 | 4 |
| 18 | 60 | 15 | 15 | 10 | 8 |

TABLE 15-continued

| No. | H501 PP resin | V0115 EPR | N0372 EBR | Talc filler | Treated material 1 PU resin |
|---|---|---|---|---|---|
| 19 | 50 | 15 | 15 | 10 | 20 |
| 20 | 70 | 15 | 15 | 10 | 30 |
| Comparative example 16a | 60 | 15 | 15 | 10 | 0 |

Each example was formed with the twin-screw extruder of the treating device 3 into a strand-like state to obtain pellets.

Homo-type PP, ethylene propylene rubber, ethylene butene rubber and talc were respectively weighed and mixed together. The mixture was extruded while kneading with the extruder to prepare a master batch. The resin temperature was 200° C. the number of revolutions of a screw was 500 rpm, and the kneading time was about 2 minutes.

The master batch dried and a predetermined crosslinking, polyurethane resin were mixed and extruded again. The resin temperature was 260° C., the number of revolutions of a screw was 500 rpm, and the kneading time was about 2 minutes. In the comparative example No. 16a containing no polyurethane resin, the extruding was performed, again, to make heat history thereof equal to that of the examples Nos. 16 to 20. Next, pellents thus obtained were dried and subjected to an injection molding at a resin temperature of 190° C. and at a mold temperature of 60° C., thus preparing test pieces.

Each test piece was subjected to an Izod impact test (JIS K7110) at a normal temperature. The test results are shown in TABLE 16.

TABLE 16

| No. | Izod impact value (J/m$^2$) |
|---|---|
| Example | |
| 16 | 410 |
| 17 | 450 |
| 18 | 460 |
| 19 | 230 |
| 20 | 180 |
| Comparative example 16a | 100 |

As apparent from TABLE 16, the Izod impact value of each of the alloy-type resins is improved due to the addition of talc as the solid filler and the crosslinking polyurethane resin. This shows that the composite resin material of the present embodiment is effective in improvement of the chemical properties.

Embodiment 9

The phase structures of test pieces of the example No. 20 and comparative example No. 16a unevaluated, which are polymer alloy-based composite resin materials, were observed with a transmission electron microscope (TEM).

Figure 5A:
FIG. 5 (A) is a photograph through a transmission electron microscope, which shows a dispersing state of tale and crosslinking polyurethane resin particles in a cross-section of a resin of a composite body of an example No. 20 in accordance with the present invention.
Figure 5B:
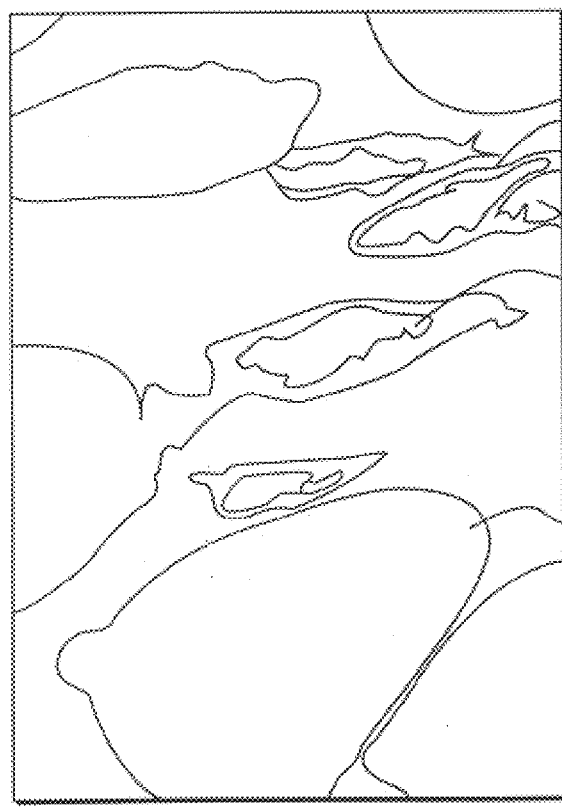

The photograph of the example No. 20 through the transmission electron microscope is shown in FIG. 5(A), and a model diagram thereof is shown in FIG. 5(B). The photograph of the comparative example No. 16a through the transmission electron microscope is shown in FIG. 6(A), and a model diagram thereof is shown in FIG. 6B).

Figure 6A:
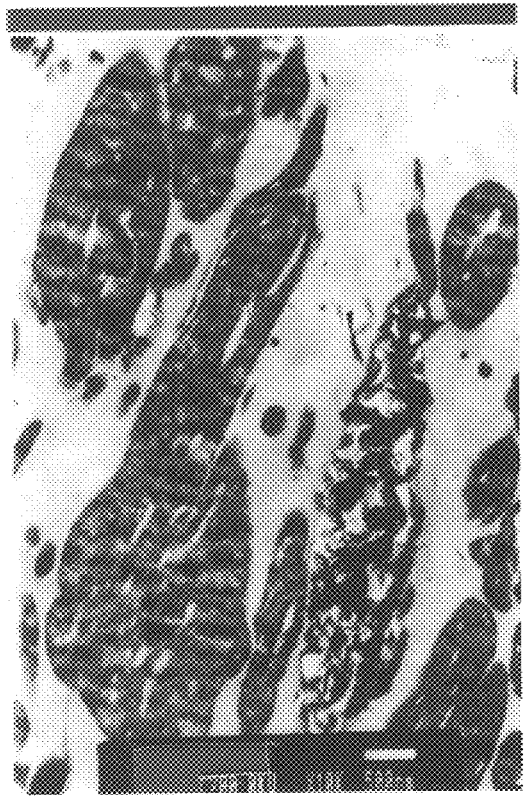
Figure 6B:
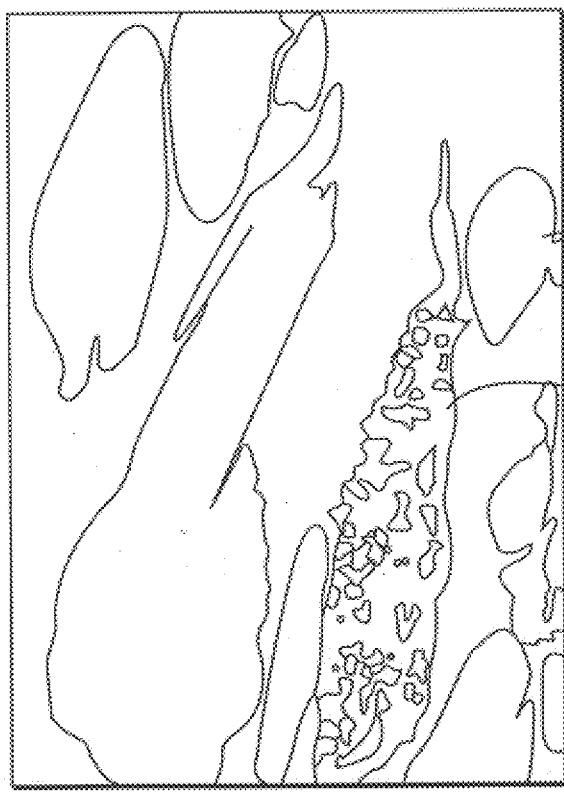

As apparent from FIGS. 6(A) and 6(B), in the comparative example No. 16a, talc 1 as a solid filler exists in the nonreactive resin (homo-type PP resin matrix and rubber particles 3).

In contrast, as apparent from FIGS. 5(A) and 5(B), in the example No. 20, a hydrolysis product of crosslinking polyurethane resin cohere so as to cover talc 1. This shows that talc as a solid filler acts as a crystal core.

These TEM observation results show that the hydrolysis product of crosslinking polyurethane resin coheres in the rubber phase 3 near the interfaces with the resin phase.

Next, the melting point and crystallizing point of each of the example No. 20, comparative example No. 6a (homo-type PP resin 100%) and comparative example 16a (having the same composition as that of the example No. 20 except that the treated material 1 is not included) were measured with a differential scanning calorimeter (DSC). Samples for evaluation were prepared by cutting unevaluated test pieces formed by injection molding. The evaluation results are shownin TABLE 17.

TABLE 17

| | melting point (° C.) | crystallizing point (° C.) |
|---|---|---|
| Example 20 | 168.4 | 123.9 |
| Comparative example | | |
| 6a | 168.9 | 125.5 |
| 16a | 168.2 | 131.5 |

The crystallizing point of the comparative example No. 16a was higher by about 6° C. than that of the comparative example No. 6a composed of homo-type PP resin due to the core effect of talc. In contrast, the crystallizing point of the example No. 20 was as low as that of the comparative example 6a, which shows that the core effect of talc is lost. From these evaluation results, it can be confirmed that the hydrolysis product of crosslinking polyurethane resin coheres around talc as a core material.

Embodiment 10

Test pieces of the example No. 17 which was a polymer alloy-based composite resin material and comparative example No. 13a were subject ted to a tensile test (JIS K7161 and JIS K7162) And the phase structure of the crazing (white) parts produced in each test piece was observed with a transmission electron microscope (TEM).

As a result of the TEM observation, it was confirmed that in the example No. 17, many micro crazings were produced and they absorbed deformation energy, whereas in the comparative example No. 13 which did not include any hydrolysis product of crosslinking polyurethane resin, the number of micro crazings produced was small.

Next, the phase structure of the crazing parts produced in each test piece of the example No. 17 and comparative example No. 13a, which had been subjected to the tensiletest, respectively, was observed with a scanning electron microscope (SEM).

Figure 7A:
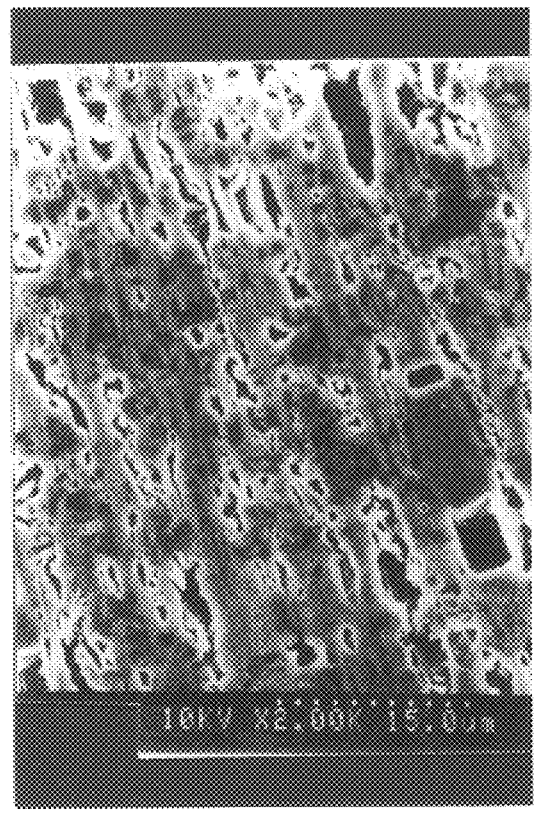
FIG. 7 (A) is a photograph through a scanning electron microscope, which shows a structure of a crazing part of a test piece of an example No. 17 after a tensile test.
Figure 7B:
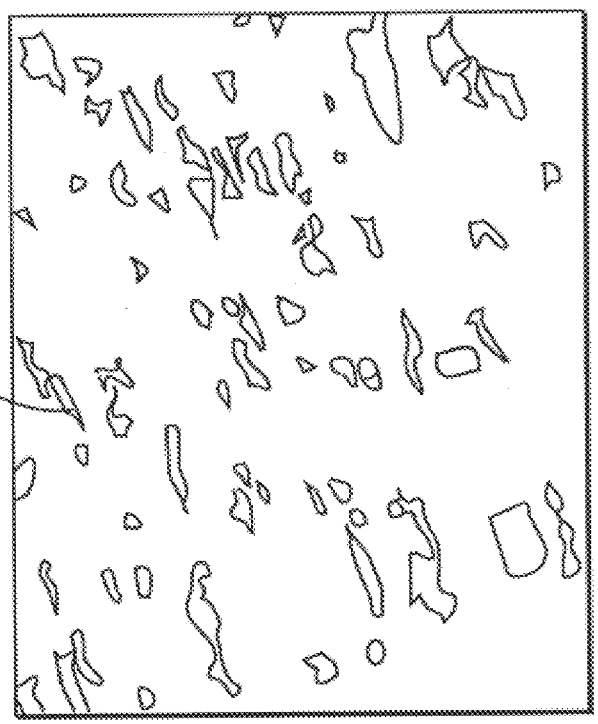
Figure 8A:
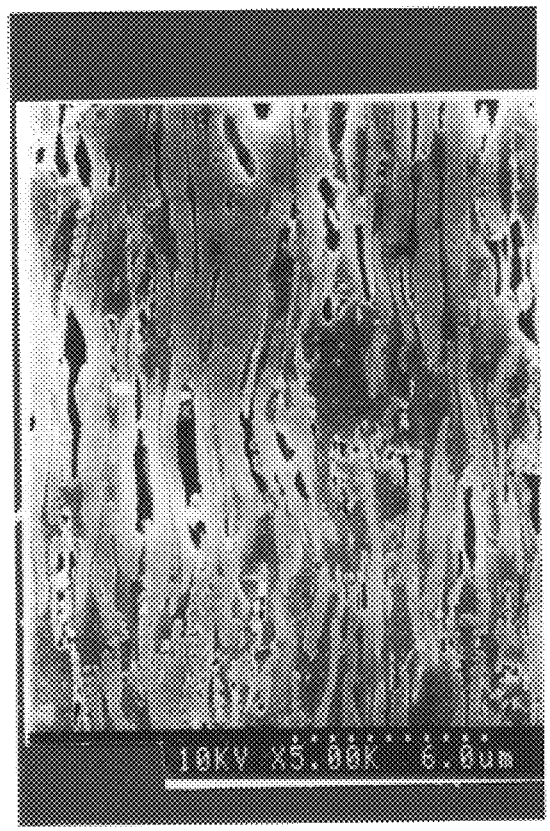
FIG. 8 (A) is a photograph through a scanning electron microscope, which shows a structure of a crazing part of a test piece of a comparative example No. 17a after a tensile test.

The photograph of the example No. 17 through the scanning electron microscope is shown in FIG. 7(A), and the photograph of the comparative example No. 13a through The scanning electron microscope is shown in FIG. 8(A), As shown in FIGS. 7(A) and 7(B), in the example No. 17, many micro voids (eye phenomenon) 6 were produced.

Figure 8B:
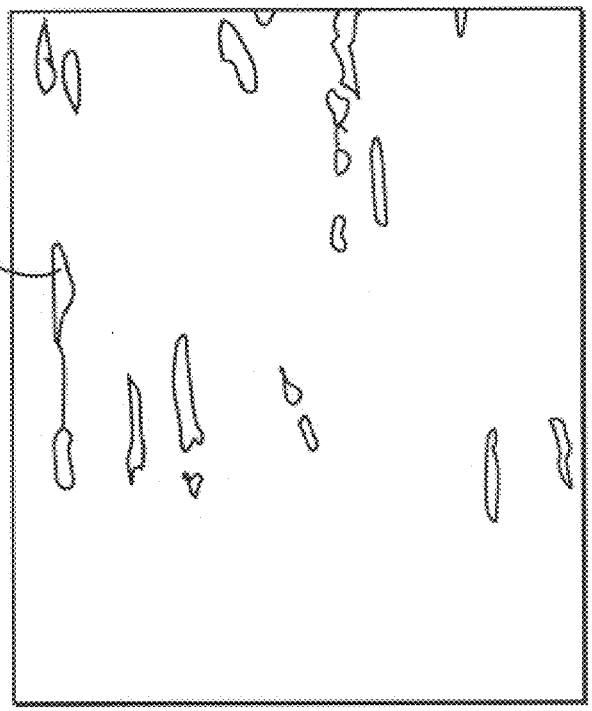

In contrast, as shown in FIGS. 8(A) and (B), in the comparative example No. 13a which did not contain any hydrolysis product of crosslinking polyutrethane resin, the number of micro voids 6 generated therein was small, as compared to the example No. 17. The magnification of FIGS. 8(A) and 8(B) is about twice that of FIGS. 7(A) and 7(B). Considering the difference in magnification of photographs, it can be well understood that the number of micro voids 6 generated in the comparative example No. 13a is very small, as compared to the example No. 17.

The observation results of the example No. 17 show that the hydrolysis product phase of crosslinking polyurethane resin acts as a starting point of the micro voids (eye phenomenon) and micro crazings to increase the number thereof, which absorb deformation energy and improve the mechanical properties.

Embodiment 11

The specific gravity of the crazing parts of the test pieces after a tentile test was measured to obtain a holding rate of the specific gravity based on the initial specific gravity.

Homo-type PP resin (H501) as a nonreactive resin, talc, and PU resin in a naturally moisture-absorbing state (moisture content: about 0.8% ) were used to prepare examples Nos. 21 and 22 and comparative examples Nos. 7a and 10a. The composition ratio of each example is shown in TABLE 18.

TABLE 18

| No. | H501 (homo-type PP resin) | Talc (solid filler) | Treated material (PU resin) |
|---|---|---|---|
| Example | | | |
| 21 | 80 | 10 | 10 |
| 22 | 60 | 10 | 30 |
| Comparative example | | | |
| 7a | 90 | 10 | 0 |
| 10a | 90 | 0 | 10 |

Each example was formed with the biaxial extruder of the treating device 3 into a strand-like state to obtain pellets. Next, the pellets were dried and subjected to an injection molding, thus preparing test pieces.

In the extruding step, the homo-type PP, talc and treated material 1 were respectively weighted and mixed together while kneading. The resin temperature was 260° C. which was not less than the melting point of the nonreactive resin and not less than the hydrolysis temperature of the crosslinking polyurethane resin, the number of revolutions of a screw was 500 rpm, and the kneading time was about 2 minutes. The injection molding was performed at a resin temperature of 190° C. and at a mold temperature of 60° C.

The holding rate of the specific gravity of the crazing parts of each test piece based on the initial specific gravity thereof is shown in TABLE 19.

TABLE 19

| | Displacement of test piece (%) | | | | | | |
|---|---|---|---|---|---|---|---|
| | 0 | 10 | 20 | 30 | 50 | 100 | 200 |
| Example | | | | | | | |
| 21 | 100 | 94 | 90 | 88 | 82 | 78 | 72 |
| 22 | 100 | 93 | 88 | — | — | — | — |
| Comparative example | | | | | | | |
| 7a | 100 | 97 | 95 | 92 | — | 86 | 81 |
| 10a | 100 | 96 | 92 | 90 | — | 85 | 80 |

As apparent from TABLE 19, in the examples Nos. 21 and 22, each being composed of talc (solid filler) and a hydrolysis product of crosslinking polyurethane resin, the lowering rates of the specific gravity relative to the displacement thereof were greater than those of the comparative examples. This shows that many micro crazings and micro voids were produced in the examples of the present embodiment.

These results show that the hydrolysis product phase of crosslinking polyurethane resin acts as a starting point of the micro voids (eye phenomenon) and micro crazings to increase the number thereof, which absorb deformation energy and improve the mechanical properties.

Embodiment 12

The melt viscosity of each of homo-type PP resin(H501), EPR(V0115), EBR(N0372) and a hydrolysis product of PU resin (Treated material 3) at 240° C. was measured with a constant load moldflow tester (JIS K 6719). The evaluated results are shown in TABLE 20.

TABLE 20

| Evaluation sample | Melt viscosity (poise) |
|---|---|
| homo-type PP (H501) | 2370 |
| EPR (V0115) | 4940 |
| EBR (N0372) | 5260 |
| Treated material 3 | 560 |

As apparent from TABLE 20, the melt viscosity of the hydrolysis product of PU resin was greatly lower than those of other resin materials. This shows that the PU resin easily coheres around the solid filler.

The measuring temperature was 240° C. which was higher than the temperature of the resin upon injection molding (about 200° C.). But, it can be judged that this high measuring temperature had no influence on the relative variation of the melt viscosity.

It has been also confirmed that if rubber materials have melt viscosities lower than that of the home type PP resin in the above compostion, the tiller shifts to a rubber phase.

Embodiment 13

Examples Nos. 11, 23 to 25 and comparative examples No. 8a were formed by using homo-type PP resin (H 501) as a nonreactive resin, talc as a solid filler, PU resin in a naturally moisture-absorbing state (moisture content: about 0.8%) (Treated material 1) and a hydrolysis product of PU resin (Treated material 3). The composition ratio of each example is shown TABLE 21.

TABLE 21

| No. | H501 homotype PP resin | Talc solid filler | Treated material PU resin | Treated material hydrolysis product of PU resin |
|---|---|---|---|---|
| Example | | | | |
| 11 | 80 | 20 | 10 | 0 |
| 23 | 80 | 20 | 0 | 10 |
| 24 | 80 | 20 | 10 | 0 |
| 25 | 80 | 20 | 0 | 10 |
| Comparative example 8a | 80 | 20 | 0 | 0 |

The method of mixing talc and conditions of extruding are shown in TABLE 22. The extruding was performed at a resin temperature nf 190° C. and at a mold temperature of 60° C.

TABLE 22

| No. | Treating device | Method of mixing talc | Extruding conditions | | |
|---|---|---|---|---|---|
| | | | Resin temp. | Number of rev. | Kneading time |
| Example | | | | | |
| 11 | 3 | adding outside | 260° C. | 500 rpm | 2 min. |
| 23 | 3 | adding outside | 190° C. | 500 rpm | 2 min. |
| 24 | 3 | adding inside | 260° C. | 500 rpm | 2 min. |
| 25 | 3 | adding inside | 190° C. | 500 rpm | 2 min. |
| Comparative example 8a | 3 | adding outside | 260° C. | 500 rpm | 2 min. |

The examples Nos. 11 and 23 and the comparative example No. 8a were formed with the twin-screw extruder of the treating device 3 into a strand-like state to obtain pellts. Next, the pellets were dried and subjected to an injetctionmolding, thus preparing test pieces.

In the extruding step, the homo-type PP, talc andtreated material 1 or 3 were respectively weighted and mixedtogether while kneading. The resin temperature upon extruding the example No. 11 was not less than the melting point of the nonreactive resin and not less than the hydrolysis temperature of the crosslinking polyurethane resin. The resin temperature upon extruding the example No. 23 was not less than the melting point of the nonreactive resin.

The examples Nos. 24 and 25 were formed as follows. Homo-type PP and talc were respectively weighted and mixed while kneading with the twin-screw extruder of the treating device 3, and a resultant mixture was kneaded with an extruder at a resin temperature of 190° C., thus forming a master batch.

Next, a predetermined amount of PU resin or a hydrolysis product thereof was added to the master batch dried,and the resultant mixture was subjected to an extruding operation, again. The resin temperature upon extending the example No. 24 was not less than the melting point of the nonreactive resin and not less than the hydrolysis temperature ofthe crosslinking polyurethane resin.

The resin temperature upon extruding the example No. 25 was not less than the melting point of the nonreactive resin.

An Izod impact test (JIS K7110) was performed ata normal temperature. The evaluation results are shown in TABLE 23.

The evaluation results of the examples Nos. 11, 23, 24 and 25 show that the materials of the present embodiment exhibit improved mechanical properties.

TABLE 23

| No. | Izod impact value (J/m²) |
|---|---|
| Example | |
| 11 | 73 |
| 23 | 68 |
| 24 | 60 |
| 25 | 57 |
| Comparative example 8a | 25 |

With the composite resin material in accordance with the present invention, due to heat applied to the crosslinking polyurethane resin, and hydrolysis, conversion reaction or the like generated therein, linking points of the crosslinking pot urethane resin mixed with a reactive resin are cut, which results in the crosslinking polyuethane resin being softened. And due to a shearing force, the crosslinking polyurethane resin changes into a fine and homogeneous state, and gradually crosslinks with the reactive resin to form a copolymer therewith. This results in the crosslinking polyurethane resin dispersing homogeneously in the reactive resin, as compared to the case where the crosslinking polyurethane resin powder is merely added, thus effecting improved physical properties substantially equal to those of a graft resin.

By kneading a crosslinking polyurethane resin powder and a nonreactive resin under hydrolysis conditions, linking points of the crosslinking polyurethane resin are cut due to hydrolysis, which results in the crosslinking polyurethane resin being softened. And due to a shearing force, PU resin powder changes into a fine and homogeneous state with the nonreactive resin. If the nonreactive resin has polar groups, urethane links and the polar groups interact with eachother to enhance the compatibility in a resin, thus restraining lowering of the physical properties thereof. Accordingly, the composite resin material thus formed can exhibit an excellent effect as a filler, as compared to the case where the mechanically pulverized crosslinking polyurethane resin is merely added.

Even where the particle diameter of the crosslinking polyurethane resin is larger than 1 mm, it can react with a thermoplastic resin easily and exhibit good compatibility therewith similarly to the preceding cases, and can disperse in a resin as fine particles due to a shearing force. The finely dispersing and softened crosslinking polyurethane resin enables improvement of the surface quality and break strength of the resulting composite resin material.

The crosslinking polyurethane resin has urethane bonds, and urea bonds as main bonds and also has allophanate bonds and biuret bonds as secondary bonds. The crosslinking polyurethane resin generates amino groups and hydroxyl groups as reactive groups resulting from the hydrolysis thereof.

It can be estimated that rubber components of the polymer alloy improve the compatibility of finely dispersing polyurethane resin and thermoplastic resin, and that by kneading the polymer alloy at a temperature of not less than the oxidation temperature thereof active groups such as carboxyl groups are generated to bond with the polyurethane resin chemically. This prevents the polyurethane resin from acting as a starting point of breaking of the material, thus improving the mechanical properties thereof.

If the composite resin material includes a solid filler, the solid filler acts as a cohesion core for the hydrolysis product of crosslinking polyurethane resin so as to be surrounded therewith. This enables more finely dispersing of the crosslinking polyurethane resin in the nonreactive resin.

When a molding of the composite resin material of the present invention deforms, interlaces between fine particles of the hydrolysis product of crosslinking polyurethaneresin and nonreactive resin (or polymer alloy thereof) peeloff to produce micro voids (eye phenomenon), thus absorbingdeformation energy. This results in the mechanical properties of the molding of the composite resin material being improved.

The hydrolysis product of crosslinking polyurethane resin coheres or disperses in interfaces between rubber and resin of the polymer alloy to act as a start point of micro crazings, thus enabling further improvement of the mechanical properties of the molding of the composite resin material.

While the invention has been described in connectin with what are considered presently to be the most practical and preferred embodiments, it is to be understood that the invention is not limited to the disclosed embodiments but on the contrary, is intended to cover various modifications and equivalent arrangements included within the spirit and scope of the appended claims.

What is claimed is:

1. A composite resin material comprising:
   (a) a matrix of at least one of a nonreactive resin and a polymer alloy of said nonreactive resin with a rubber;
   (b) particles of a hydrolysis product of a crosslinked polyurethane resin having a melt viscosity at a kneading and molding temperature lower than the melt viscosity of said nonreactive resin, or said polymer alloy, at said kneading and molding temperature and wherein the crosslinks of said polyurethane resin are partly cut and partly maintained, the particles of said hydrolysis product being dispersed in said matrix; and
   (c) particles of a solid filler forming a core within the particles of said hydrolysis product,
   wherein each of said nonreactive resin and polymer alloy thereof is a resin which has no functional groups reactable with crosslinks of the crosslinked polyurethane resin or with active groups of the hydrolysis product resulting from hydrolysis thereof, and which is meltable by heating.

2. The composite resin material as claimed in claim 1 wherein said nonreactive resin contains an olefin-based thermoplastic resin as a main ingredient.

3. The composite resin material as claimed in claim 2 wherein said olefin-based thermoplastic resin contains a polypropylene resin as a main ingredient.

4. The composite resin material as claimed in 1 wherein said polymer alloy contains an olefin-based rubber and an olefin-based thermoplastic resin as main ingredients.

5. The composite resin material as claimed in claim 1 wherein said crosslinked polyurethane resin is derived from a hydroxy compound, an isocyanate compound and a crosslinking agent as main ingredients and said resin is formed by reaction injection molding.

6. The composite resin material as claimed in claim 5 wherein said hydrolysis product of crosslinked polyurethane resin has the form of fine particles with a particle diameter of not greater than 200 μm.

7. The composite resin material as claim in claim 1 wherein said hydrolysis product of crosslinked polyurethane resin has the form of fine particles with a particle diameter of not greater than 200 μm.

8. The composite resin material as claimed in claim 1 wherein said solid filler has a particle diameter of not greater than 100 μm.

9. The composite resin material as claimed in claim 1 wherein said solid filler is talc.

10. The composite resin material as claimed in claim 1 wherein the weight ratio of said hydrolysis product of crosslinked polyurethane resin and said solid filler is from 5:1 to 1:20.

11. The composite resin material of claim 1, wherein, upon said material being deformed, interfaces between said particles of said hydrolysis product and said matrix peel off so as to enable the composite resin material to absorb deformation energy.

12. A method of forming a composite resin material comprising the step of kneading a nonreactive resin, a water-containing crosslinked polyurethane resin, and a solid filler at a temperature of not less than the melting point of said nonreactive resin and not less than the hydrolysis temperature of said water-containing crosslinked polyurethane resin, wherein said nonreactive resin is a resin which has no functional groups reactable with crosslinks of the crosslinked polyurethane resin or with active groups of a hydrolysis product resulting from hydrolysis of said polyurethane resin, and which is meltable by heating.

13. A method of forming a composite resin material as claimed in claim 12, wherein the nonreactive resin has a melt viscosity at the temperature of said kneading which is higher than a melt viscosity of a hydrolysis product of the polyurethane resin at said kneading temperature.

14. A method of forming a composite resin material comprising the step of kneading f a nonreactive resin having a melt viscosity at a kneading temperature, (ii) a hydrolysis product of a crosslinked polyurethane resin having a melt viscosity at said kneading temperature lower than said melt viscosity of said nonreactive resin and (iii) a solid filler at a temperature of not less than the melting point of said nonreactive resin, wherein said nonreactive resin is a resin which has no functional groups reactable with crosslinks of the crosslinked polyurethane resin or with active groups of a hydrolysis product resulting from hydrolysis of said polyurethane resin, and which is meltable by heating.

15. A method of forming a composite resin material comprising the step of kneading, in the presence of water, a crosslinked polyurethane resin, a nonreactive resin or a polymer alloy of said nonreactive resin with a rubber, and a solid filler, at a temperature of not less than the melting point of said nonreactive resin or said polymer alloy thereof and not less than the hydrolysis temperature of said crosslinked polyurethane resin wherein said nonreactive resin, or polymer alloy, has no functional groups reactable with crosslinks of the crosslinked polyurethane resin or with active groups of a hydrolysis product resulting from hydrolysis of said polyurethane resin, and which is meltable by heating.

* * * * *

UNITED STATES PATENT AND TRADEMARK OFFICE
CERTIFICATE OF CORRECTION

PATENT NO.: 6,015,856
DATED: January 18, 2000
INVENTORS: Mitsumasa MATSUSHITA et al.

It is certified that an error appears in the above-identified patent and that said Letters Patent is hereby corrected as shown below:

Claim 4, column 27, line 34, insert --resilient-- after "olefin-based".

Claim 14, column 28, line 28, "f" should read --(i)--.

Signed and Sealed this

Twenty-seventh Day of March, 2001

Attest:

NICHOLAS P. GODICI

Attesting Officer

Acting Director of the United States Patent and Trademark Office